US011470032B2

(12) United States Patent
Guo

(10) Patent No.: US 11,470,032 B2
(45) Date of Patent: Oct. 11, 2022

(54) METHOD FOR RECOMMENDING GROUPS AND RELATED ELECTRONIC DEVICE

(71) Applicant: BEIJING DAJIA INTERNET INFORMATION TECHNOLOGY CO., LTD., Beijing (CN)

(72) Inventor: Shaoze Guo, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 17/085,113

(22) Filed: Oct. 30, 2020

(65) Prior Publication Data

US 2021/0160207 A1 May 27, 2021

(51) Int. Cl.
*H04L 51/222* (2022.01)
*H04L 51/046* (2022.01)
*H04L 51/52* (2022.01)
*H04L 51/212* (2022.01)
*H04L 51/214* (2022.01)
*G06Q 50/00* (2012.01)
*H04L 51/58* (2022.01)

(52) U.S. Cl.
CPC .......... *H04L 51/222* (2022.05); *H04L 51/046* (2013.01); *H04L 51/212* (2022.05); *H04L 51/214* (2022.05); *H04L 51/52* (2022.05); *G06Q 50/01* (2013.01); *H04L 51/58* (2022.05)

(58) Field of Classification Search
CPC ....... H04L 51/20; H04L 51/046; H04L 51/12; H04L 51/14; H04L 51/32
See application file for complete search history.

(56) References Cited

U.S. PATENT DOCUMENTS

| 8,103,540 | B2* | 1/2012 | Gross | G06Q 30/0204 |
| | | | | 705/7.33 |
| 9,407,719 | B2* | 8/2016 | van de Bruggen | G06Q 50/01 |
| 9,818,146 | B2* | 11/2017 | Caralis | G06Q 30/0631 |
| 2013/0090980 | A1* | 4/2013 | Hummel | G06Q 50/01 |
| | | | | 705/7.29 |
| 2014/0067826 | A1* | 3/2014 | Jackson | G06F 16/337 |
| | | | | 707/748 |
| 2014/0067943 | A1* | 3/2014 | Jackson | G06Q 30/0269 |
| | | | | 709/204 |
| 2014/0164270 | A1* | 6/2014 | Fan | G06Q 10/00 |
| | | | | 705/319 |

(Continued)

FOREIGN PATENT DOCUMENTS

| CN | 104615616 A | 5/2015 |
| CN | 106302085 A | 1/2017 |

(Continued)

OTHER PUBLICATIONS

English translation of OA for CN application201911156277.2.
OA for CN application201911156277.2.

*Primary Examiner* — Benjamin M Thieu
(74) *Attorney, Agent, or Firm* — Timothy W. Menasco, Esq.; Harter Secrest & Emery LLP

(57) ABSTRACT

The disclosure provides a method for recommending a group, a related electronic device, and a computer readable storage medium. At least two groups to be joined are obtained. For the groups to be joined, group quality indexes are determined depending on attribute information of the groups. One or more group is recommended depending on the group quality indexes.

15 Claims, 2 Drawing Sheets

(56) References Cited

U.S. PATENT DOCUMENTS

2014/0258503 A1* 9/2014 Tong ..................... G06Q 50/01
709/224

FOREIGN PATENT DOCUMENTS

| CN | 107977411 | A | | 5/2018 | | |
|----|-----------|---|---|--------|---|---|
| CN | 108259638 | A | | 7/2018 | | |
| CN | 108304428 | A | | 7/2018 | | |
| CN | 107977411 | B | * | 12/2021 | ............. | G06F 16/95 |

* cited by examiner

METHOD FOR RECOMMENDING GROUPS AND RELATED ELECTRONIC DEVICE

CROSS REFERENCE TO RELATED APPLICATIONS

This application is based on and claims priority to Chinese Patent Application No. 201911156277.2, filed on Nov. 22, 2019, in the China National Intellectual Property Administration, the disclosure of which is herein incorporated by reference in their entireties.

FIELD

The disclosure relates to a field of communication technologies, and more particularly to a method and an apparatus for recommending groups, an electronic device, and a computer readable storage medium.

BACKGROUND

Instant messaging (IM) is a terminal service, allowing two or more people to transmit text messages, files, speeches and videos instantly over the network to communicate with each other. With instant messaging software, the instant messaging between users may be realized. By using the instant messaging software, every word inputted by the user may be instantly displayed on a client of a partner user communicating with the user.

SUMMARY

According to the present disclosure, a method for recommending groups is provided. The method includes: obtaining a plurality of groups; for each group, obtaining a group quality index based on attribute information of the group; and recommending one or more groups based on the group quality indexes.

According to the present disclosure, an electronic device is provided. The electronic device includes: a processor and a memory. The memory is configured to store instructions executable by the processor. When the instructions are executed by the processor, the processor is configured to execute a method for recommending groups.

According to the present disclosure, a computer readable storage medium is also provided. When instructions in the storage medium are executed by a processor of an electronic device, the electronic device is enabled to execute a method for recommending groups.

It should be understood that, the above general description and the following detailed description are only exemplary and explanatory, and do not limit the disclosure.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with aspects of the present disclosure as detailed in the appended claims.

Terms used herein in the description of the present disclosure are merely for the purpose of describing specific embodiments, but should not be construed to limit the present disclosure. As used in the description of the disclosure and the appended claims, terms "a," "an," and "the" in singular forms intend to include plural forms, unless clearly indicated in the context otherwise. It should also be understood that, as used herein, term "and/or" represents and contains any one and all possible combinations of one or more listed items.

It should be understood that, although terms such as "first", "second" and "third" may be used herein to describe various objects, these objects should not be limited by these terms. These terms are only used for distinguishing one object from another object. For example, a first object may also be called as a second object, and similarly, the second object may also be called as the first object, without departing from the scope of the present disclosure. Depending on the context, the term "if" may be understood to mean "when" or "upon" or "in response to the determination of".

Instant messaging (IM) is a terminal service, allowing two or more people to transmit text messages, files, speeches and videos instantly over the network to communicate with each other. With the development of communication technology, the instant messaging has become a mainstream direction of applications of the Internet. With the instant messaging software, the instant messaging between users may be realized. By using the instant messaging software, every word inputted by the user may be instantly displayed on a client of a partner user communicating with the user. In this way, not only one-to-one instant messaging may be realized, but also instant messaging among multiple users may be realized when the multiple users join a group in the instant messaging software.

However, after joining the group, the user may stop paying attention to content of the group or quit the group for some reasons, such as less activeness of the group. In this case, the user cannot get more information or socialize effectively by the group, experience of the user is low and the existence of the group is meaningless.

Figure 1:
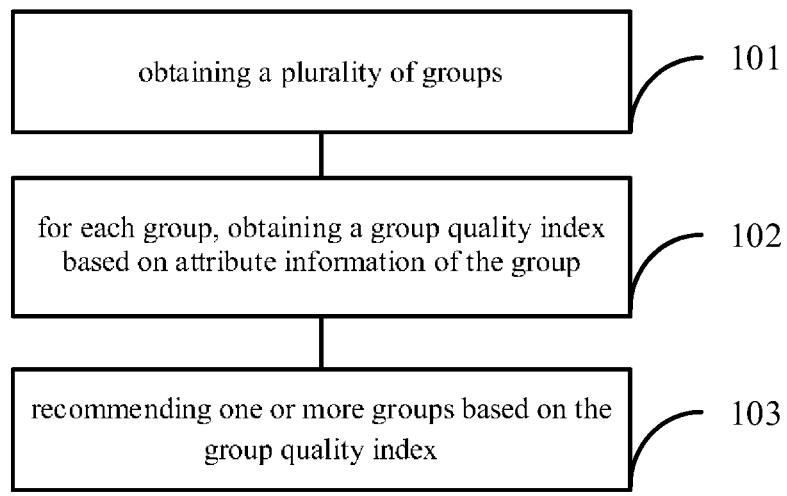
FIG. 1 is a flowchart illustrating a method for recommending groups according to an example embodiment of the present disclosure.

In view of above, embodiments of the disclosure provide a method for recommending groups. As illustrated in FIG. 1, a flowchart illustrating a method for recommending groups according to an example embodiment of the present disclosure is provided. The method may be applied to an electronic device. The electronic device may be a device having an instant messaging service, such as a mobile phone, a computer, a tablet, a PDA (personal digital assistant), a multimedia player, a server, a cloud, and a wearable device. The method includes the following.

In 101, multiple groups are obtained.

In 102, for each group, a group quality index is obtained based on attribute information of the group.

In 103, one or more groups are recommended based on the group quality index.

For the 101, the electronic device may obtain the groups (also called as groups to be joined) during recommending one or more groups. The groups to be joined may be all of established groups or some selected groups based on a selection condition. It may be understood that, the selection condition may be set in advance and is not limited in embodiments of the present disclosure, which may be set based on an actual condition. As an example, the selection condition may include, but be not limited to, one or more of that an existence duration of the group (or an establishment duration since the group is established) is not less than a duration threshold, the group matches a query, the group is located within a preset range of a specified geographic location, and the group belongs to a target classification. Based on the selection condition, the groups to be joined may include one or more of a group having the existence duration not less than a duration threshold, a group matching the query (that is, the name or the profile of the group includes the query), a group located within the preset range obtained based on the specified geographic location, and a group of the target classification selected from preset classifications (i.e., the target classification may be selected by the user from the preset classifications or determined by the electronic device from the preset classifications). The duration threshold, the preset range and the preset classification may be set based on the actual requirements. For example, the duration threshold may be 2 days, 10 days or 15 days. The preset range may be a circle by taking the specified position as the center and by taking 500 or 1000 meters as a radius. The preset classification may be set by the electronic device, or may be set by the user based on a preference of the user. For example, the preset classification may include classifications of game, friend making, animation, interest, and the like, which is not limited in embodiments of the present disclosure. With embodiments of the present disclosure, the groups are filtered based on the selection condition to filter out the groups that do not meet the selection condition, such that the number of groups to which the quality evaluation is performed is reduced, which not only shortens time required by the quality evaluation, but also saves computing resources.

Each established group has corresponding attribute information for describing the group. It may be understood that the attribute information of the group is not limited in embodiments of the present disclosure, which may be set based on a specific application scene. In an example, the attribute information may include, but be not limited to, one or more of an upper limit of the number of members in the group, and the current number of members in the group, the number of examinations (i.e, the number of processing examinations, which includes the number of approving examinations and the number of refusing examinations), the number of joining requests (including the number of approving examinations, the number of refusing examinations, and the number of waiting to be examined), the number of members sending messages, the amount of text messages (including the amount of abnormal messages and the amount of other messages), a decision whether a group leader sends a message, the number of pieces of messages sent by the group leader (i.e., the number of times that the group leader sends a message), and the number of active days (i.e., the number of days in which a member send messages). It may be understood that, in embodiments, there is no restriction on the meaning of the "abnormal messages" contained in the "amount of abnormal messages", which may be set based on actual requirements. For example, the abnormal message may include a "Follow" message and a "Likes" message, such as "XXX clicks a 'like' button of your profile photo", and "XXX follows you". The amount of abnormal messages includes the amount of the "Follow" messages and the amount of the "Likes" messages.

Further, the electronic device may filter groups based on the attribute information to obtain the groups to be joined. In an example, the groups to be joined may include a group that the current number of the members in the group is not less than a specified number, a group that the number of members sending messages is not less than a specified number, a group that the number of pieces of messages sent by the group leader is not less than a predetermined number, a group that a difference between the existence duration (in days) of the group and the number of active days of the group is not greater than a specified period, or a combination thereof, which is not limited in embodiments of the present disclosure. The specified number, the predetermined number, and the specified period may be set based on an actual application scene. With embodiments of the present disclosure, the groups are filtered based on the attribute information to filter out the groups which do not meet the selection condition, thereby reducing the number of groups to which the quality evaluation is performed, which may not only shorten time required by the quality evaluation, but also save computing resources.

For the 102, the electronic device may obtain the group quality index for each group to be joined based on attribute information of each group to be joined after obtaining the groups to be joined. In an implementation, for each group, the electronic device determines an influence factor based on the attribute information, and determines the group quality index based on the influence factor. It may be understood that, embodiments of the present disclosure do not make any restrictions on the setting of the influence factor, which may be set based on the actual requirements. In embodiments of the present disclosure, by obtaining the group quality index of the group to be joined based on the attribute information of the group to be joined, a quality of the group to be joined may be actually reflected by the group quality index. Therefore, high-quality groups may be recommended to the user, which is helpful for the user to socialize effectively or obtain effective information.

In an example, the influence factor includes, but is not limited to, one or more of a group saturation, an activeness of the group, a group joining rate, an activeness of the group leader, and a joining approval rate.

In an example, the attribute information at least includes the upper limit of the number of members in the group and the current number of members in the group, and the influence factor at least includes the group saturation. In this case, the electronic device may obtain a ratio of the current number of members in the group to the upper limit of the number of members in the group as a value of the group saturation. With embodiments of the present disclosure, by obtaining the group saturation that truly reflects the quality of the group to be joined, the group quality index of the group to be joined is accurately determined based on the value of the group saturation, thereby accurately providing the high-quality group to the user.

In some embodiments, the attribute information at least includes the number of members sending messages and the amount of text messages (including the amount of abnormal messages and the amount of other messages), and the influence factor at least includes the activeness of the group. In this case, the electronic device may determine a value of the activeness of the group based on the number of members sending messages, the amount of text messages, and the amount of abnormal messages. Corresponding weight coefficients may be determined for the number of members sending the messages, the amount of text messages and the amount of abnormal messages based on the actual requirements, and the value of the activeness of the group may be determined based on a relationship among the number of members sending the text messages, the amount of text messages and the amount of abnormal messages and corresponding weight coefficients. With embodiments of the present disclosure, by obtaining the activeness of the group that truly reflects the quality of the group to be joined, the group quality index of the group to be joined is accurately determined based on the value of the activeness of the group, thereby accurately providing high-quality groups to the user.

In an implementation, the applicant has been found that, within a preset period (set based on the actual requirements) since the group is established, users who send messages may make contributes greatly to the activeness of the group, such that the activeness of the group may increase rapidly. After the preset period, with the increase of the number of members sending messages, the contribution to the activeness of the group is decreased, such that the activeness of the group increases slowly. Therefore, a logarithmic function having the above regulation may be employed to reflect the contribution of the number of members sending messages to the activeness of the group in embodiments of the present disclosure. Similarly, within a preset period (set based on the actual requirements) since the group is established, sending text messages may contributes greatly to the activeness of the group. After the preset period, with the increase of the number of text messages, the contribution to the activeness of the group decreases. Therefore, a logarithmic function having the above regulation may be employed to reflect the contribution of the number of text messages sent to the activeness of the group in embodiments of the present disclosure. In addition, the increase of the amount of abnormal messages leads to the decrease of the activeness of the group, that is, the amount of abnormal messages is inversely proportional to a contribution value of the activeness of the group. For example, the amount of abnormal messages may include the amount of "Follow" messages and the amount of "Likes" messages. A large amount of "Follow" messages and the amount of "Likes" messages may cause boredom of the user. With the increase of the amount of "Follow" messages and the amount of "Likes" messages, the boredom of the user also increases, such that the contribution to the activeness of the group decreases. That is, the amount of abnormal messages is linearly inversely proportional to the activeness of the group. Based on the above, given that the weight coefficient determined for the number of members sending messages is represented by A, the weight coefficient determined for the amount of text messages is represented by B, the weight coefficient determined for the amount of the abnormal messages is represented by C, the activeness of the group is represented by Z, the number of members sending messages is represented by X, the amount of text messages is represented by Y, and the amount of abnormal messages is represented by $Y_1$, the activeness of the group may be obtained as: $Z=A\times\log_a(a\times X+1)+B\times\log_a(Y-Y_1+1)-C\times Y_1$, where, a is a positive number greater than 1. As an example, the weight coefficient determined for the number of members sending messages is 20, the weight coefficient determined for the amount of text messages is 5, the weight coefficient determined for the amount of abnormal messages is 10, and the base of the logarithmic function is 10, then the activeness of the group is represented as follows: $Z=20\times\lg(10\times X+1)+5\times\lg(Y-Y_1+1)-10\times Y_1$.

In some embodiments, the attribute information at least includes the number of examinations and the number of joining requests, and the influence factor at least includes the group joining rate. The electronic device may determine the value of the group joining rate based on the number of examinations and the number of joining requests. In a case that the number of joining requests does not equal to 0, the electronic device may obtain a ratio of the number of examinations to the number of joining requests as the value of the group joining rate. In addition, it is meaningless to have a denominator of 0 when the number of joining requests equals to 0. Therefore, in this case the electronic device may obtain a sum of the number of examinations and a value other than 0, as well as a sum of the number of joining requests and the value other than 0 (noted that, the value other than 0 is the same for both cases of the number of examinations and the number of joining requests). The ratio of these two sums may be determined as the value of the group joining rate. As an example, given that the value other than 0 may be 1, the group joining rate is represented by e, the number of examinations is represented by f, and the number of joining requests is represented by g, then $$e = \frac{f+1}{g+1}.$$

With embodiments of the present disclosure, by obtaining the group joining rate that truly reflects the quality of the group, the group quality index of the group is accurately determined based on the value of the group joining rate, thereby accurately providing the high-quality group to the user.

In some embodiments, the attribute information at least includes the number of approving examinations and the number of joining requests, and the influence factor at least includes the joining approval rate. The electronic device may determine the value of the joining approval rate based on the number of approving examinations and the number of joining requests. In cases that the number of joining requests does not equal to 0, the electronic device may obtain a ratio of the number of approving examinations to the number of joining requests as the value the joining approval rate. In addition, it is meaningless to have a denominator of 0 when the number of joining requests equals to 0. Therefore, in this case, the electronic device may obtain a sum of the number of approving examinations and a value other than 0, as well as a sum of the number of joining requests and the value other than 0 (noted that, the value other than 0 is the same for both cases of the number of approving examinations and the number of joining requests), and then take a ratio of the two sums as the value of the joining approval rate. As an example, given that the value other than 0 equals to 1, the joining approval rate is represented by $e_1$, the number of approving examinations is represented by $f_1$, and the number of joining requests is represented by g, the joining approval rate is obtained as follows:

$$e_1 = \frac{f_1+1}{g+1}.$$

With embodiments of the present disclosure, by obtaining the joining approval rate that truly reflects the quality of the group, the group quality index of the group is accurately determined based on the value the joining approval rate, thereby accurately providing the high-quality group to the user.

In some embodiments, the attribute information at least includes the number of pieces of messages sent by the group leader, and the influence factor at least includes the activeness of the group leader. The electronic device may determine the value of the activeness of the group leader based on the number of pieces of messages sent by the group leader. As an implementation, a reference value may be set, and a ratio of the number of pieces of messages sent by the group leader to the reference value is determines as the value of the activeness of the group leader. It may be understood that, the reference value may be set based on the actual application scene, which is not limited in embodiments of the present disclosure. With embodiments of the present disclosure, by obtaining the activeness of the group leader that truly reflects the quality of the group, the group quality index of the group is accurately determined based on the value of the activeness of the group leader, thereby accurately providing the high-quality group to the user.

In an implementation, when there are various influence factors, a corresponding weight coefficient may be set for each influence factor based on importance of each influence factor. The electronic device may generate the group quality index for evaluating the group to be joined based on the values of the influence factors and the weight coefficients corresponding to the influence factors. In detail, the electronic device may calculate a product of the value of each influence factor and the respective weight coefficient, and calculate a sum of all the products as the group quality index. It may be understood that, the detailed value of the weight coefficient is not limited in embodiments of the present disclosure, which may be set based on the actual application scene. In an example, the influence factor includes the group saturation (for example, the group saturation is represented by $a_1$, the corresponding weight coefficient is 10, and the group saturation is negatively correlated with the group quality index), the activeness of the group (for example, the activeness of the group is represented by $b_1$, and the corresponding weight coefficient is 10), the group joining rate (for example, the group joining rate is represented by $c_1$, and the corresponding weight coefficient is 10), and a result whether the group leader sends a message (for example, the result is represented by $e_1$, the corresponding weight coefficient is 10, the value is 1 when the group leads sends a message, and the value is 0 when the group lead does not send any message), the group quality index is represented by $g_1$, then $g_1=10\times c_1+(10-10\times a_1)+10\times b_1+10\times e_1$. With embodiments of the present disclosure, by determining the group quality index of each group, the high-quality group are recommended to the user based on the value of the group quality index, which is helpful for the user to socialize effectively or to obtain effective information.

For the block 103, the electronic device may recommend one or more groups based on the group quality index of each group after evaluating the group quality index of the group. With embodiments of the present disclosure, the group quality index of each group to be joined is obtained based on the attribute information of each group, and the one of more groups to be joined are recommended based on the group quality index of each group, thereby recommending the high-quality group to the user. The user may obtain more information or perform effective social interaction through the group, and the experience of the user is improved.

In an implementation, the electronic device may recommend one or more group to be joined based on a descending order of the group quality indexes of the groups to be joined. In this way, the high-quality groups may be displayed to the user without screening the groups by the user, thereby reducing operations and time required by screening the groups and improving the experience of the user.

In an implementation, after the group quality indexes of the groups to be joined are obtained, the electronic device may filter out one or more groups to be joined each having the group quality index less than a preset threshold, and recommend one or more of remaining groups to be joined based on a descending order of group quality indexes of the remaining groups to be joined. With embodiments of the present disclosure, the groups each having a lower group quality index are filtered out and not recommended or displayed to the user, such that the high-quality groups are displayed to the user without screening the groups by the user, thereby reducing operations and time required by screening the groups by the user and improving the experience of the user.

Figure 2:
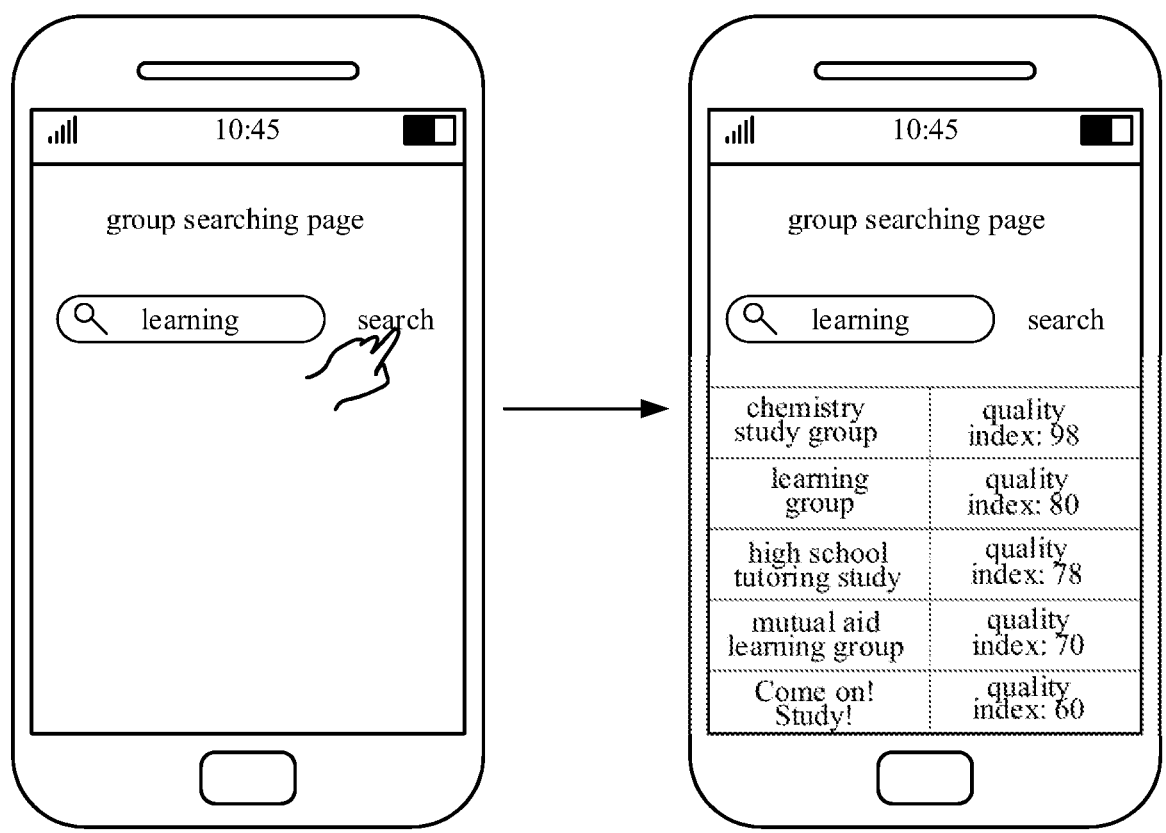
FIG. 2 is a diagram illustrating interactions of a method for recommending groups according to an example embodiment of the present disclosure.

As an example, a mobile phone is taken as an example for descriptions. As illustrated in FIG. 2, the user inputs a keyword "learning" on a group searching page displayed on a touch screen and clicks "search". After receiving the keyword, the electronic device may send the keyword to a server having all of established groups stored thereon. The server selects groups each having the group name or the group profiles including the keyword "learning" from all the established groups as the groups to be joined. Each group has corresponding attribute information for describing the group. After selecting the groups to be joined, the server sends the groups to be joined and the corresponding attribute information to the electronic device. The attribute information at least includes an upper limit of the number of members in the group, the current number of members in the group, the number of examinations, the number of joining requests, the number of members sending messages, the amount of text messages, and the number of pieces of messages sent by the group leader. For each group to be joined, the electronic device determines the value of the influence factor based on the attribute information after obtaining the groups to be joined. The influence factor at least includes the group saturation, the activeness of the group, the group joining rate, the activeness of the group leader, the joining approval rate. The group saturation is determined based on the upper limit of the number of members in the group and the current number of members in the group. The activeness of the group is determined based on the number of members sending messages and the amount of text messages. The group joining rate is determined based on the number of examinations and the number of joining requests. The activeness of the group leader is determined based on the number of pieces of messages sent by the group leader. The number of examinations includes the number of approving examinations and the number of refusing examination. The joining approval rate is determined based on the number of approving examinations and the number of joining requests.

After the value of the influence factor of each group to be joined is determined, the electronic device may generate the group quality index for evaluating the group to be joined based on the value of the influence factor and the corresponding weight coefficient. After the groups to be joined each having the group quality index less than the preset threshold are filtered out, the electronic device displays the remaining groups to be joined on the group search page based on the descending order of the group quality indexes of the remaining groups to be joined. Further, as illustrated in FIG. 2, the group quality index of each group may also be displayed to the user for reference. With embodiments of the present disclosure, the group quality index of the group is obtained based on the attribute information of the group, and the recommendation of groups is provided based on the group quality index, thereby facilitating to recommend the high-quality groups to the user, enabling the user to obtain more content from the groups or perform effective social interaction, and improving the experience of the user.

Figure 3:
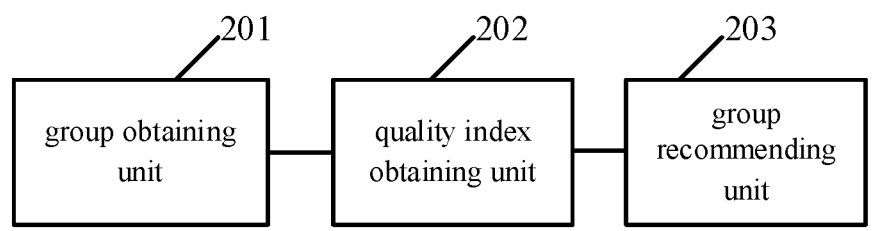
FIG. 3 is a block diagram illustrating an apparatus for recommending groups according to an example embodiment of the present disclosure.

Corresponding to embodiments of the method for recommending the group in the disclosure, the disclosure also provides embodiments of an apparatus for recommending groups, an electronic device, and a computer readable storage medium As illustrated in FIG. 3, a block diagram illustrating an apparatus for recommending groups according to an example embodiment of the disclosure is provided. The apparatus includes: a group obtaining unit 201, a quality index obtaining unit 202, and a group recommending unit 203.

The group obtaining unit 201 is configured to obtain a plurality of groups.

The quality index obtaining unit 202 is configured to, for each group, obtain a group quality index of the group based on attribute information of the group.

The group recommending unit 203 is configured to recommend one or more groups based on the group quality indexes.

In some embodiments, the quality index obtaining unit 202 includes: an influence factor determining module and a quality index obtaining module.

The influence factor determining module is configured to, for each group, determine an influence factor based on the attribute information.

The quality index obtaining module is configured to determine the group quality index based on the influence factor.

In some embodiments, the attribute information at least includes an upper limit of the number of members in the group and the current number of members in the group. The influence factor at least includes a group saturation.

The influence factor determining module is configured to: for each group, obtain a ratio of the current number of members in the group to the upper limit of the number of members in the group as the group saturation.

In some embodiments, the attribute information at least includes the number of members sending messages and an amount of text messages. The amount of text messages includes an amount of abnormal messages. The influence factor at least includes an activeness of the group.

The influence factor determining module is configured to: for each group, determine the activeness of the group based on the number of members sending messages, the amount of text messages, and the amount of abnormal messages.

In some embodiments, the attribute information at least includes the number of examinations and the number of joining requests. The influence factor at least includes a group joining rate.

The influence factor determining module is configured to: for each group, determine the group joining rate based on the number of examinations and the number of joining requests.

In some embodiments, the attribute information at least includes the number of approving examinations and the number of joining requests. The influence factor at least includes a joining approval rate.

The influence factor determining module is configured to: for each group, determine the joining approval rate based on the number of approving examinations and the number of joining requests.

In some embodiments, the attribute information at least includes the number pieces of messages sent by the group leader. The influence factor at least includes an activeness of the group leader.

The influence factor determining module is configured to: for each group, determine the activeness of the group leader based on the number of pieces of messages sent by the group leader.

In some embodiments, the quality index obtaining module is configured to: generate the group quality index based on the influence factor and a weight coefficient corresponding to the influence factor.

In some embodiments, the group recommending unit 230 is configured to: recommend one or more groups to be joined based on a descending order of the group quality indexes of the plurality of groups to be joined.

In some embodiments, the group recommending unit 230 is configured to: filter out one or more groups to be joined each having the group quality index less than a preset threshold, recommend one or more of remaining groups to be joined based on a descending order of group quality indexes of the remaining groups to be joined.

In some embodiments, the groups to be joined are selected from all groups based on a selection condition.

The selection condition includes one or more of: an existence duration being not lower than a duration threshold, a group matching a query, and a group being located within a preset range of a specified geographic location.

Since embodiments of the apparatus basically correspond to embodiments of the method, partial description of the embodiments of the method may be referred for relevant points. The above embodiments of the apparatus are only exemplary. The units described as separate components may or may not be physically separated. Components displayed as units may or may not be physical units, that is, they may be located in one place or distributed to a plurality of network units. Some or all of the modules may be selected based on an actual requirement to achieve the purpose of the solution of the present disclosure. The skilled in the art may understand and implement the solution without paying creative labor.

Figure 4:
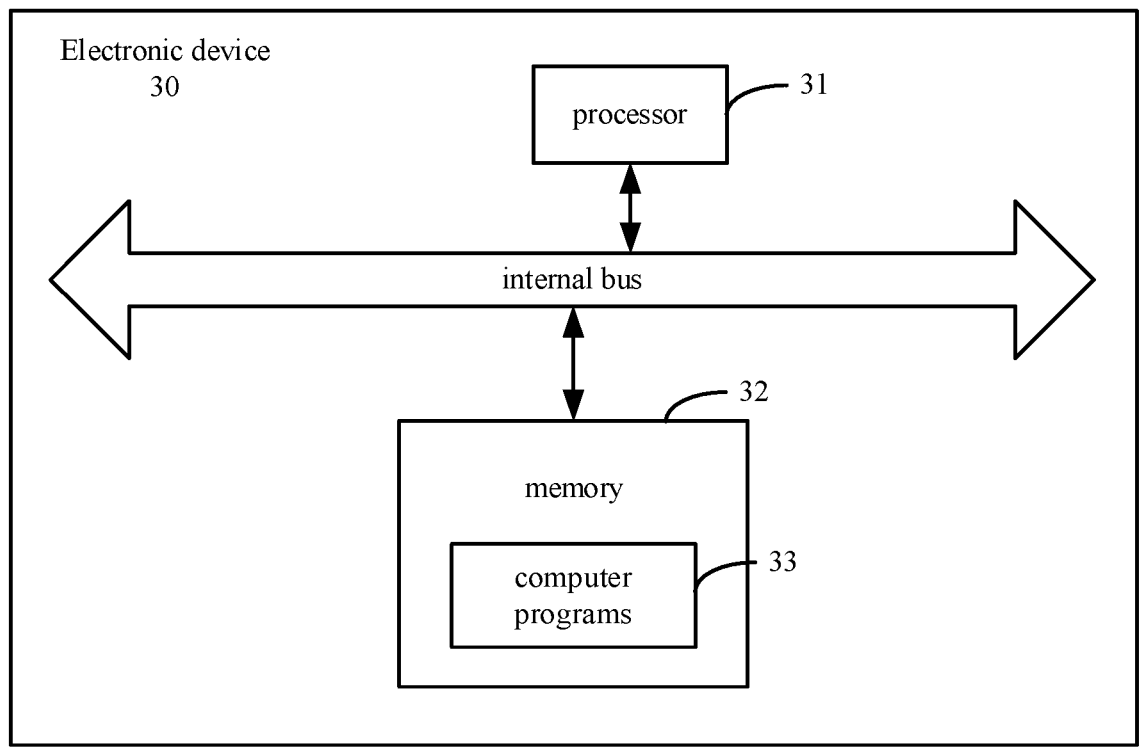
FIG. 4 is a block diagram illustrating an electronic device according to an example embodiment of the present disclosure.

FIG. 4 is a block diagram illustrating an electronic device 30 according to an example embodiment of the present disclosure. The electronic device 30 includes a processor 31 and a memory 32. The memory 32 is configured to store executable instructions. The memory 32 includes computer programs 33. The processor 31 is configured to execute blocks of the above-mentioned method.

The processor 31 is configured to execute the computer programs 33 included in the memory 32. The processor 31 may be a central processing unit (CPU) or another a general-purpose processor, a digital signal processor (DSP), an application specific integrated circuit (ASIC), a field-programmable gate array (FPGA), another programmable logic device, a discrete gate, a transistor logic device, a discrete hardware component, and the like. The general-purpose processor may be a microprocessor or any conventional processor.

The memory 32 is configured to store computer programs related to the method. The memory 32 may include at least one type of storage medium. The storage medium includes a flash memory, a hard disk, a multimedia card, a card-type memory (such as, a SD (secure digital) or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. The device may cooperate with a network storage device that performs a storage function of the memory by a network connection. The memory 32 may be an internal storage unit of the device 30, such as a hard disk or a memory of the device 30. The memory 32 may also be an external storage device of the device 30, such as a plug-in hard disk, a smart media card (SMC), a secure digital (SD) card, a flash card, disposed on the device 30. Further, the memory 32 may also include both the internal storage unit of the device 30 and the external storage device. The memory 32 is configured to store the computer program 33 and other programs and data required by the device. The memory 32 may also be configured to temporarily store data that has been output or will be output.

The various embodiments described herein may be implemented by using the computer readable medium such as computer software, hardware, or any combination thereof. For a hardware implementation, embodiments described herein may be implemented by using at least one of: an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. For a software implementation, an implementation such as a procedure or a function may be implemented with a separate software module that allows at least one function or operation to be performed. Software codes may be implemented by a software application (or program) written in any suitable programming language, and the software codes may be stored in the memory and executed by the controller.

The electronic device 30 includes, but is not limited to, a mobile terminal, an ultra-mobile personal computer device, a server, and other electronic device with a computing function. (1) The mobile terminal is characterized by having a function of mobile communication and aiming at providing a voice and data communication. Such mobile terminal includes a smart phone (such as iPhone), a multimedia phone, a functional phone, and a low-end phone. (2) The ultra-mobile personal computer device belongs to a category of personal computer, which has a computing and processing function, and generally has a feature of mobile Internet access. Such terminal includes a PDA (personal digital assistant), a MID (mobile Internet device) and a UMPC (ultra mobile personal computer) devices, such as an iPad. (3) The server provides a computing service. A composition of the server includes a processor, a hard disk, a memory, a system bus, etc. The server is similar to the general computer architecture, but because the server only provides a highly reliable service, it requires a higher processing capacity, stability, reliability, security, scalability and manageability. (4) Other electronic device with the computing function may include, but be not limited to, the processor 31 and the memory 32. It may be understood by the skilled in the art that, FIG. 4 is merely an example of the electronic device 30, and does not constitute a limitation of the electronic device 30. The electronic device 30 may include more or less components than illustrated, some combined components, or different components. For example, the electronic device may also include an input device, an output device, a network access device, a bus, a camera device, etc.

The implementation procedure of the functions of each unit in the above device may refer to the implementation procedure of the corresponding actions in the above method, which is not elaborated here.

In some embodiment, there is also provided a storage medium including instructions, such as the memory 32 including instructions. The above instructions may be executed by the processor 31 of the electronic device 30 to perform the above method. In some embodiments, the storage medium may be a non-transitory computer readable storage medium. For example, the non-transitory computer readable storage medium may include the ROM, the random-access memory (RAM), the CD-ROM (compact disc read-only memory), a magnetic tape, a floppy disk, optical data storage device, etc.

A non-transitory computer readable storage medium is provided. When instructions stored in the storage medium are executed by a processor of a terminal, the terminal is enabled to execute the above method for recommending a group.

In some embodiments, there is also provided a computer program product including executable program codes. The program codes are configured to execute any of the above embodiments of the method when executed by the above device.

Other embodiments of the disclosure may readily be apparent to the skilled in the art after consideration of the specification and practice of the disclosure disclosed herein. This disclosure is intended to cover any modification, use or adaptation of the disclosure, which follows the general principles of the disclosure and includes common knowledge or conventional technical means in the skilled in the art not disclosed in the disclosure. The specification and examples are merely exemplary, with the true scope and the spirit of the disclosure being indicated by the following claims.

It should be understood that, the present disclosure is not limited to a precise structure described above and illustrated in the accompanying drawings, and various modifications and changes may be made without departing from the scope of the disclosure. The scope of the disclosure is limited merely by the appended claims.

What is claimed is:

1. A method for recommending groups, comprising:
   obtaining a plurality of groups;
   for each group, determining at least one influence factor based on attribute information;
   determining a group quality index based on at least one influence factor; and
   recommending one or more groups based on the group quality indexes,
   wherein said determining at least one influence factor, comprising: determining a group saturation by calculating a ratio of a current number of members in the group to an upper limit of the number of members in the group, and determining an activeness of the group based on the number of members sending messages, an amount of text messages, and an amount of abnormal messages, the amount of text messages comprising the amount of abnormal messages; and
   wherein said determining the group quality index, comprising: determining the group quality index based on the group saturation and the activeness of the group.

2. The method according to claim 1, wherein said determining the at least one influence factor, further comprising:

determining a group joining rate based on the number of examinations and the number of joining requests.

3. The method according to claim 1, wherein said determining the at least one influence factor, further comprising:
determining a joining approval rate based on the number of approving examinations and the number of joining requests.

4. The method according to claim 1, wherein said determining the at least one influence factor, further comprising:
determining an activeness of a group leader based on the number of pieces of messages sent by the group leader.

5. The method according to claim 1, wherein said determining the group quality index based on the at least one influence factor, comprising:
setting a corresponding weight coefficient for each influence factor based on importance of each influence factor; and
determining the group quality index based on values of the influence factors and the weight coefficients corresponding to the influence factors.

6. The method according to claim 1, wherein said recommending the one or more groups comprising:
recommending the one or more groups based on a descending order of the group quality indexes.

7. The method according to claim 1, wherein said obtaining the plurality of groups comprising:
obtaining the group having an existence duration not less than a duration threshold; or
obtaining the group matching a query; or
obtaining the group located within a distances range of a specified geographic location.

8. The method of claim 1, wherein said determining the activeness of the group, comprising:
determining the activeness of the group based on the number of members sending messages, the amount of text messages, and the amount of abnormal messages by using a logarithmic function.

9. An electronic device, comprising:
a processor; and
a memory, configured to store instructions executable by the processor;
wherein when the instructions stored in the memory are executed by the processor, the processor is configured to:
obtain a plurality of groups;
for each group, determine at least one influence factor based on attribute information;
determine a group quality index based on at least one influence factor; and
recommend one or more groups based on the group quality indexes,
wherein the at least one influence factor comprises a group saturation, and the processor is configured to determine the group saturation by calculating a ratio of a current number of members in the group to an upper limit of the number of members in the group and determine an activeness of the group based on the number of members sending messages, an amount of text messages, and an amount of abnormal messages, the amount of text messages comprising the amount of abnormal messages; and determine the group quality index based on the group saturation and the activeness of the group.

10. The electronic device according to claim 9, wherein the at least one influence factor comprises a group joining, and the processor is configured to:
determine the group joining rate based on the number of examinations and the number of joining requests.

11. The electronic device according to claim 9, wherein the at least one influence factor comprises a joining approval rate, and the processor is configured to:
determine the joining approval rate based on the number of approving examinations and the number of joining requests.

12. The electronic device according to claim 9, wherein the at least one influence factor comprises an activeness of a group leader, and the processor is configured to:
determine the activeness of a group leader based on the number of pieces of messages sent by the group leader.

13. The electronic device according to claim 9, wherein the at least one influence factor comprises a joining approval rate, and the processor is configured to:
determine the group quality index based on the influence factor and a weight coefficient corresponding to the influence factor.

14. The electronic device according to claim 9, wherein the processor is configured to:
recommend the one or more groups based on a descending order of the group quality indexes.

15. The electronic device according to claim 9, wherein the processor is configured to:
obtain the group having an existence duration not less than a duration threshold; or
obtain the group matching a query; or
obtain the group located within a distances range of a specified geographic location.

* * * * *